United States Patent
Wu

(10) Patent No.: US 11,893,438 B2
(45) Date of Patent: Feb. 6, 2024

(54) POSITIVE FEEDBACK LATCH AMPLITUDE LIMITING CONTROL CIRCUIT AND METHOD OF PASSIVE RADIO FREQUENCY IDENTIFICATION TAG

(71) Applicant: EXCELIO TECHNOLOGY (SHENZHEN) CO., LTD., Shenzhen (CN)

(72) Inventor: Patrick Bian Wu, Shenzhen (CN)

(73) Assignee: EXCELIO TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 17/928,763

(22) PCT Filed: Oct. 12, 2021

(86) PCT No.: PCT/CN2021/123268
§ 371 (c)(1),
(2) Date: Nov. 30, 2022

(87) PCT Pub. No.: WO2022/083475
PCT Pub. Date: Apr. 28, 2022

(65) Prior Publication Data
US 2023/0229883 A1 Jul. 20, 2023

(30) Foreign Application Priority Data
Oct. 24, 2020 (CN) .......................... 202011151063.9

(51) Int. Cl.
*G06K 19/07* (2006.01)
*G06K 19/077* (2006.01)
(52) U.S. Cl.
CPC ... *G06K 19/0723* (2013.01); *G06K 19/07773* (2013.01)

(58) Field of Classification Search
CPC .................... G06K 19/0723; G06K 19/07773
(Continued)

(56) References Cited

U.S. PATENT DOCUMENTS

2004/0078662 A1* 4/2004 Hamel .................. H02N 2/186
714/22
2005/0247785 A1* 11/2005 Bertin .................. G06K 7/0086
235/441
(Continued)

FOREIGN PATENT DOCUMENTS

CN 101038616 A 9/2007
CN 103699929 A 4/2014
(Continued)

OTHER PUBLICATIONS

World Intellectual Property Organization (WIPO) International Search Report for PCT/CN2021/123268 dated Jan. 13, 2022 7 pages.

*Primary Examiner* — Paultep Savusdiphol
(74) *Attorney, Agent, or Firm* — ANOVA LAW GROUP, PLLC

(57) ABSTRACT

A positive feedback latch amplitude limiting control circuit and method of the passive radio frequency identification tag of the present disclosure dynamically control the voltage between the first and the second antenna terminal. When the voltage between the antenna terminals is too high, the signal generating circuit turns on the discharge circuit, which reduces the rectified DC voltage. When the voltage between the antenna terminals is within the limited voltage, the signal generating circuit turns off the discharge circuit. The discharge circuit in the present disclosure includes a MOS transistor whose gate voltage is indirectly controlled by a latch. A positive feedback mechanism of the latch makes the first control signal S1 have a substantially strong strength when being pulled to a low level, such that the discharge (Continued)

path is fully turned off, which avoids a discharge of the MOS transistor being in a sub-threshold region, thereby improving communication performance.

9 Claims, 4 Drawing Sheets

(58) Field of Classification Search
USPC .......................................................... 235/492
See application file for complete search history.

(56) References Cited

U.S. PATENT DOCUMENTS

2008/0094027 A1* 4/2008 Cho .................. H02J 50/60
320/108
2016/0364587 A1* 12/2016 Wu .................... G06K 7/10217

FOREIGN PATENT DOCUMENTS

| CN | 106874988 A | 6/2017 |
|----|-------------|--------|
| CN | 112288068 A | 1/2021 |
| WO | 2015103956 A1 | 7/2015 |

* cited by examiner phase entry under 35 U.S.C
POSITIVE FEEDBACK LATCH AMPLITUDE LIMITING CONTROL CIRCUIT AND METHOD OF PASSIVE RADIO FREQUENCY IDENTIFICATION TAG

CROSS-REFERENCE TO RELATED APPLICATIONS

This application is a national phase entry under 35 U.S.C § 371 of International Application PCT/CN2021/123268, filed Oct. 12, 2021, which claims priority of Chinese Patent Application No. 202011151063.9, filed Oct. 24, 2020, the entire content of all of which are incorporated herein by reference.

FIELD OF THE DISCLOSURE

The present disclosure generally relates to the field of radio frequency identification technology and, more particularly, relates to a positive feedback latch amplitude limiting control circuit applied to a passive radio frequency identification tag and a method of using the positive feedback latch amplitude limiting control circuit to perform graded amplitude limiting control.

BACKGROUND

A passive radio frequency identification (RFID) tag itself does not contain a battery, and relies on electromagnetic energy sent by a card reader to operate. Because the passive RFID tag has a simple structure and is economical and practical, the passive RFID tag has been widely used in logistics management, asset tracking and mobile medical fields.

When operating, the passive RFID tag absorbs the electromagnetic energy sent by the reader from the surrounding environment. After absorbing energy, the passive RFID tag rectifies a part of the energy into a DC power supply for an internal circuit of the passive RFID tag to operate. The passive RFID tag also inputs another part of the energy into an internal modulation and demodulation circuit. The modulation and demodulation circuit demodulates an amplitude modulated signal carried in the energy, and sends the demodulated signal to a digital baseband portion of the passive RFID tag for processing.

In terms of energy, because a distance between the passive RFID tag and the card reader varies, when the passive RFID tag operates, the strength of electromagnetic field energy absorbed from the surrounding environment also varies. When the passive RFID tag is too close to the card reader or the electromagnetic energy sent by the card reader is too strong, the signal strength received by the passive RFID tag is also substantially strong. Therefore, a voltage induced on the coil exceeds a withstand voltage limit of the transistor used in a rectifier module in the chip, which causes permanent damage to the transistor, and results in the failure of the RFID tag.

In terms of digital communication, a transmitter coil of the card reader sends out a carrier wave whose amplitude is modulated by a digital signal, and the passive RFID tag obtains an amplitude-modulated radio frequency field signal through the coupling of the induction coil, and detects and demodulates real information from the carrier wave through the demodulation circuit. When the passive RFID tag is too close to the card reader or the electromagnetic energy sent by the card reader is too strong, the demodulation circuit inside the passive RFID tag may not be able to distinguish the level of the carrier envelope signal, in other words, the received signal is saturated, which causes communication failure. This kind of failure is more likely to occur in the reader talk first (RTF) communication mode in which the reader first sends a command and then waits for the response of the passive RFID tag.

To solve the above-mentioned problems where the withstand voltage reliability of the internal device in the circuit of the passive RFID tag and the saturation of the received signal, an amplitude limiting processing circuit needs to be applied in the circuit of the passive RFID tag chip, to ensure that the voltage across the antenna of the passive RFID tag is limited to a predetermined value.

Designing an amplitude limiting circuit of the passive RFID tag faces a design problem, in other words, under the extremely strong field condition at a close distance and the extremely weak field condition at a long distance, the value of the amplitude limiting range and the path capability for discharging to achieve the amplitude limiting purpose are difficult to be optimized simultaneously. On the one hand, if the value of the amplitude limiting magnitude voltage is too high, the discharge path will be turned on too late under the extremely strong field condition, which does not effectively protect the devices with limited internal voltage tolerance; on the contrary, when the value of the amplitude limiting magnitude voltage is too low, the discharge path will not be fully turned off under the extremely weak field condition, and the leakage current will cause great energy loss. On the other hand, if the discharge path is designed too small, the discharge is insufficient under the extremely strong field condition, which will also cause a risk of high voltage breakdown due to excessive voltage amplitude at the output terminal of the rectifier circuit; on the contrary, if the discharge path is designed too large, the discharge path will have a large leakage current even under the turned-off condition, which causes energy loss and reduces communication distance. The communication performance of the existing passive RFID tag products in the industry mostly depends on whether the amplitude limiting circuit processing technology of the passive RFID is capable of achieving the optimal design for these two situations.

The amplitude limiting control circuit of the passive RFID tag has received extensive innovative research and implementation technology discussions in the industry. Among them, a series of patented technologies of Excelio Technology (Shenzhen) Co. Ltd. are used as the main clues. The focuses of innovation and research include two aspects: 1) the definition, classification and judgment of the voltage level at the amplitude limiting point; and 2) the control mechanism of the discharge capacity of the amplitude limiting discharge path. First, the patented technology ZL201410009153.2, namely "Dynamic Rectification Control Circuit and Passive RFID and Dynamic Rectification Control Method", adopts a method of dynamically adjusting the voltage at the amplitude limiting point, where the instantly received field energy is rectified and a mirror current formed by proportional sampling flows through a fixed resistor, to generate a control voltage that controls the switch of the discharge path to be turned on and turned off. In addition, the patented technology ZL201410008854.4, namely "Amplitude limiting Circuit and Passive Radio Frequency Tag Capable of Continuously Adjusting Rectified Signal Amplitude", adopts a bandgap reference voltage that can be accurately defined to adjust the defined voltage of amplitude limiting point, when the output value of the bandgap reference voltage is the optimal value under all conditions of consideration, the definition of the voltage of amplitude limiting point has also been optimized. Moreover, another patented technology ZL201410009344.9, namely "Switch Signal-Controlled Rectification and Amplitude Limiting Circuit and Passive Radio Frequency Tag", innovates the control signals of the discharge paths with different discharge capabilities, and proposes that a set of switch signals are used to control these discharge paths, to substantially finely distinguish the discharge capacity required for different operations under different field energy conditions. Further, a patent technology ZL201410009326.0, namely "Rectifier Amplitude Limiting Circuit and Passive Radio Frequency Tag with Multiple Time Constants", replaces the switch logic signal used in the previous patent technology with analog signal with different rising edge delay and falling edge delay, to control the energy discharge based on the time response to open the discharge path. Furthermore, a patented technology ZL201410009440.3, namely "Intelligent Energy Management System and Energy Management Method for Passive Radio Frequency Tags", puts the definition, determination method and control of the amplitude limiting point of the passive RFID tag circuit, as well as the control of the discharge path to the system architecture design level for planning and design, to form the idea of intelligent RFID tag system design.

The design of high-performance RFID tag circuit faces further challenges, in other words, the problem of how to further improve the communication distance. Here, low-power circuit design technology often pays attention to nano-ampere ($10^{-9}$ ampere) and even pico-ampere ($10^{-12}$ ampere) leakage current, in other words, the problem of how to effectively reduce the problem of leakage current of the discharge path in the turned-off state in the passive RFID circuit design.

It is known that, the deep sub-micron integrated circuit manufacturing process reduces the metal line width, device spacing and metal line spacing step by step, and at the same time, the turn-on threshold voltage of the transistor also decreases, such that the chip system can operate at a substantially low system power supply voltage. The laws of semiconductor device physics show that the lower the turn-on threshold voltage, the lower the voltage for forming the channel and turning on the channel conduction of the transistor. At the same time, under the turned-off condition, the leakage of the transistor device is substantially significant. In the application of the long-distance response of the passive RFID tag concerned in the present disclosure, the nano-ampere level leakage will lead to the lack of satisfactory communication distance, which is a bottleneck for improving the performance of the passive RFID products.

BRIEF SUMMARY OF THE DISCLOSURE

The present disclosure provides a new technical solution for the energy management problem of a passive RFID tag chip. The core of the present disclosure includes using the circuit characteristics of the latch to make the leakage current of the passive RFID tag chip be far less than the level that can be achieved by the existing technology when the discharge path is turned off. At the same time, the energy detection part may smoothly turn on the discharge path under high-energy occasions to perform amplitude limiting control. The technical solution may also include a circuit for grading the received field energy, and a method for using the positive feedback latch amplitude limiting control circuit to perform graded amplitude limiting control. The amplitude limiting control circuit may manage the turn-on and turn-off of the discharge path with different discharge capability at a different amplitude value of the discharge path, such that the power consumption of the passive RFID tag chip may be controlled, which may not only meet the requirements of the withstand voltage of the device, but also reduce the system energy loss in long-distance response applications.

To achieve the above purposes, the technical scheme adopted by the present disclosure may include a positive feedback latch amplitude limiting control circuit of a passive radio frequency identification (RFID) tag, the circuit including: a signal generating circuit, a signal processing circuit and a discharge circuit, where:

the signal generating circuit is connected between an output terminal of a rectifier circuit and ground, and is configured to: generate a first control signal S1 that varies with change of strength of a magnetic field coupled to a coil of the passive RFID tag, input the first control signal S1 to the signal processing circuit and the discharge circuit, and receive a logic signal S2 returned by the signal processing circuit, the signal processing circuit is connected between the output terminal of the rectifier circuit and the ground, and is configured to: receive the first control signal S1, latch the first control signal S1 to a high level or a low level according to a voltage amplitude of the first control signal S1, obtain the processed logic signal S2, and return the logic signal S2 to the signal generating circuit, and the discharge circuit includes a MOS transistor whose gate voltage is indirectly controlled by a latch, and source and drain of the MOS transistor are respectively connected between the output terminal of the rectifier circuit and the ground, where: when the strength of the magnetic field coupled to the coil of the passive RFID tag is less than a preset value, the first control signal S1 is pulled down to the ground to maintain the discharge circuit in a turned-off state; when the strength of the magnetic field coupled to the coil of the passive RFID tag is greater than the preset value, the first control signal S1 is set to a high level to turn on the discharge circuit, and charges at the output terminal of the rectifier circuit are outputted to the ground; and an internal positive feedback latch mechanism of the latch makes the first control signal S1 have a substantially strong pull-down driving force when being pulled to a low level, such that a control gate of the discharge path is fully turned off, which avoids a discharge state of the MOS transistor being in a sub-threshold region, and effectively reduces a leakage current in the discharge path, thereby achieving purposes of saving system power consumption and improving communication performance.

The technical scheme of the present disclosure also includes a positive feedback latch amplitude limiting control circuit of a passive radio frequency identification (RFID) tag, the circuit including a signal generating circuit, a first signal processing circuit, a first discharge circuit, a second signal processing circuit, a second signal control circuit and a second discharge circuit, where:

the signal generating circuit is connected between an output terminal of a rectifier circuit and ground, and is configured to: generate a first control signal S1 that varies with change of strength of a magnetic field coupled to a coil of the passive RFID tag, input the first control signal S1 to the first signal processing circuit, the first discharge circuit, and the second signal processing circuit, and receive a logic signal S2 returned by the first signal processing circuit;

the first signal processing circuit is connected between the output terminal of the rectifier circuit and the ground, and is configured to: receive the first control signal S1, latch the first control signal S1 to a high level or a low level according to a voltage amplitude of the first control signal S1, obtain the processed logic signal S2, and return the logic signal S2 to the signal generating circuit;

the first discharge circuit includes a MOS transistor whose gate voltage is indirectly controlled by a latch, and source and drain thereof are respectively connected between the output terminal of the rectifier circuit and the ground, where: when the strength of the magnetic field coupled to the coil of the passive RFID tag is less than a preset value, the first control signal S1 is pulled down to the ground to maintain the first discharge circuit in a turned-off state; when the strength of the coupled magnetic field is greater than the preset value, the first control signal S1 is set to a high level to turn on the discharge circuit, and charges at the output terminal of the rectifier circuit are outputted to the ground; and an internal positive feedback latch mechanism of the latch makes the first control signal S1 have a substantially strong pull-down driving force when being pulled to a low level, such that a control gate of the discharge path is fully turned off, which avoids the discharge state of the MOS transistor being in a sub-threshold region;

the second signal processing circuit is connected between the output terminal of the rectifier circuit and the ground, and is configured to: receive the first control signal S1, latch the first control signal S1 to the high level or the low level according to the voltage amplitude of the first control signal S1, obtain a processed logic signal S2', and input the logic signal S2' to the second signal control circuit;

the second signal control circuit is connected between the output terminal of the rectifier circuit and the ground, and is configured to: generate a second control signal S3 according to the high-level or low-level of the logic signal S2', and input the second control signal S3 to the second discharge circuit;

the second discharge circuit includes a MOS transistor whose gate voltage is indirectly controlled by the latch, and source and drain thereof are respectively connected between the output terminal of the rectifier circuit and the ground, where: when the strength of the magnetic field coupled to the coil of the passive RFID tag is less than a preset value, the first control signal S1 is pulled down to the ground to maintain the discharge circuit in the turned-off state; when the strength of the coupled magnetic field is greater than the preset value, the first control signal S1 is set to a high level to turn on the discharge circuit, and the charges at the output terminal of the rectifier circuit are outputted to the ground; and an internal positive feedback latch mechanism of the latch makes the first control signal S1 have a substantially strong pull-down driving force when being pulled to the low level, such that a control gate of the discharge path is fully turned off, which avoids the discharge state of the MOS transistor being in a sub-threshold region; and the first signal processing circuit includes a capacitive device connected to the ground, a first inverting sub-module INV1 and a second inverting sub-module INV2, where a positive terminal of the capacitive device is connected to a latch flip-flop with positive feedback characteristic formed by connecting an output terminal of the first inverting sub-module INV1 and an input terminal of the second inverting sub-module INV2, and connecting an input terminal of the first inverting sub-module INV1 and an output terminal of the second inverting sub-module INV2; and the second signal processing circuit includes a detector circuit formed by at least one unidirectional conducting device with a threshold voltage and a capacitive device, a third inverting sub-module INV3 and a fourth inverting sub-module INV4, where an output terminal of the detector circuit is connected to a latch flip-flop with positive feedback characteristic formed by connecting an output terminal of the third inverting sub-module INV3 and an input terminal of the fourth inverting sub-module INV4, and connecting an input terminal of the third inverting sub-module INV3 and an output terminal of the fourth inverting sub-module INV4.

The present disclosure also provides a method of using the above disclosed positive feedback latch amplitude limiting control circuit to perform a graded amplitude limiting control, the method including following steps:

S1: a resonance circuit is coupled with an external magnetic field to generate an alternating current and inputs the alternating current to the rectifier circuit, and the rectifier circuit rectifies the alternating current into a direct current and outputs the direct current to each circuit module including the signal generating circuit, the signal processing circuit and the discharge circuit;

S2: the signal generating circuit generates the first control signal S1 that varies with the change of the strength of the magnetic field coupled to the coil of the passive RFID tag, and inputs the first control signal S1 to the signal processing circuit, where: when the voltage value of the first control signal S1 is too low to drive the inverting sub-module in the signal processing circuit to be turned on, the logic signal S2 outputted by the signal processing circuit is a high level "1"; when the voltage value of the first control signal S1 gradually increases to the turn-on voltage of the inverting sub-module, the logic signal S2 outputted by the signal processing circuit is a low level "0"; and the signal processing circuit returns the logic signal S2 of the high level "1" or the low level "0" to the signal generating circuit; and S3: when the inputted logic signal S2 is the high level "1", the first N-type MOS transistor in the signal generating circuit is turned on, and the second resistive device is short-circuited; because the resistance value of the first resistive device is far smaller than the resistance value of the second resistive device, the first control signal S1 is rapidly pulled down to a low level signal, such that the second N-type MOS transistor in the discharge circuit is turned off, and the discharge path maintains the turned-off state; when the inputted logic signal S2 is the low level "0", the first N-type MOS transistor is turned off, and the first control signal S1 maintains a high-level signal, such that the second N-type MOS transistor in the discharge circuit is turned on, the discharge path is switched from the turned-off state to the turned-on state, and the charges at an antenna terminal are outputted to the ground.

The graded control method also includes following steps:

S1: a resonance circuit is coupled with an external magnetic field to generate an alternating current and inputs the alternating current to the rectifier circuit, and the rectifier circuit rectifies the alternating current into a direct current and outputs the direct current to each circuit module including the signal generating circuit, the first signal processing circuit, the first discharge circuit, the second signal processing circuit, the second signal control circuit and the second discharge circuit;

S2: the signal generating circuit generates the first control signal S1 that varies with the change of the strength of the magnetic field coupled to the coil of the passive RFID tag, and inputs the first control signal S1 to the first signal processing circuit and the second signal processing circuit, where: when the voltage value of the first control signal S1 is too low to drive the inverting sub-module in the first signal processing circuit to be turned on, the logic signal S2 outputted by the first signal processing circuit is a high level "1"; when the voltage value of the first control signal S1 gradually increases to the turn-on voltage of the inverting sub-module, the logic signal S2 outputted by the first signal processing circuit is a low level "0"; the first signal processing circuit returns the logic signal S2 of the high level "1" or the low level "0" to the signal generating circuit; and when the voltage value of the first control signal S1 is lower than the sum of the threshold voltage of the unidirectional conducting device with a threshold voltage and the turn-on voltage of the inverting sub-module in the second signal processing circuit, the logic signal S2' outputted by the second signal processing circuit is the high level "1"; when the voltage value of the first control signal S1 gradually increases to the sum of the threshold voltage of the threshold device and the turn-on voltage of the inverting sub-module in the second signal processing circuit, the logic signal S2' outputted by the second signal processing circuit is the low level "0"; and the second signal processing circuit inputs the above logic signal S2' of the high level "1" or the low level "0" to the second signal control circuit; and S3: when the inputted logic signal S2 is the high level "1", the first N-type MOS transistor in the signal generating circuit is turned on, and the second resistive device is short-circuited; because the resistance value of the first resistive device is far smaller than the resistance value of the second resistive device, the first control signal S1 is rapidly pulled down to a low level signal, such that the second N-type MOS transistor in the first discharge circuit is turned off, and the first discharge path maintains the turned-off state; when the inputted logic signal S2 is the low level "0", the first N-type MOS transistor is turned off, and the first control signal S1 maintains a high-level signal, such that the second N-type MOS transistor is turned on, the first discharge path is switched from the turned-off state to the turned-on state, and the charges at an antenna terminal are outputted to the ground; when the inputted logic signal S2' is the high level "1", the third N-type MOS transistor in the second signal control circuit is turned on, and the fourth resistive device is short-circuited; because the resistance value of the third resistive device is far smaller than the resistance value of the fourth resistive device, the second control signal S3 is rapidly pulled down to a low level signal, such that the fourth N-type MOS transistor in the second discharge circuit is turned off, and the second discharge path maintains the turned-off state; when the inputted logic signal S2' is the low level "0", the third N-type MOS transistor is turned off, and the third control signal S3 maintains a high-level signal, such that the fourth N-type MOS transistor is turned on, the second discharge path is switched from the turned-off state to the turned-on state, and the charges at the antenna terminal are outputted to the ground.

The positive feedback latch amplitude limiting control circuit and method of the passive radio frequency identification tag of the present disclosure may dynamically rectify and control the voltage between the first antenna terminal and the second antenna terminal. When the voltage between the antenna terminals is too high, the signal generating circuit may generate a high-level signal, and after being processed, a logic low signal may be generated, and the generated high-level signal may be inputted into the discharge circuit to turn on the discharge circuit, such that the charges at the antenna terminal may be outputted to the ground, which may reduce the amount of charges at the antenna terminal and may reduce the rectified DC voltage. When the voltage between the antenna terminals is within the limited voltage, the signal generating circuit may make the signal processing circuit generate a logic high signal, and the correspondingly generated low-level signal may make the discharge circuit in the turned-off state. The rectifier circuit may rectify all the charges at the antenna terminal into DC power for the load circuit, such that the current consumption may be controlled to a certain extent and the system energy loss may be reduced.

In addition, the discharge circuit in the present disclosure may include the MOS transistor whose gate voltage is indirectly controlled by the latch, and the internal positive feedback latch mechanism of the latch may make the first control signal S1 have a substantially strong pull-down driving force when being pulled to a low level, such that the control gate of the discharge path may be fully turned off, which may avoid the discharge state of the MOS transistor being in a sub-threshold region, may effectively reduce the leakage current in the discharge path, may save system power consumption, may improve communication performance, and may play a role that cannot be achieved by the control voltage outputted by the ordinary logic circuit. The circuit of the present disclosure may have a simple structure, may be easy to realize, and may basically have no static power consumption.

DETAILED DESCRIPTION

The technical solutions in the disclosed embodiments of the present disclosure will be clearly and fully described below with reference to the accompanying drawings in the embodiments of the present disclosure. Obviously, the described embodiments are only a part of the embodiments of the present disclosure, but are not all of the embodiments. Based on the disclosed embodiments of the present disclosure, all other embodiments obtained by those of ordinary skill in the art without creative efforts shall fall within the protection scope of the present disclosure.

Embodiment 1

Figure 1:
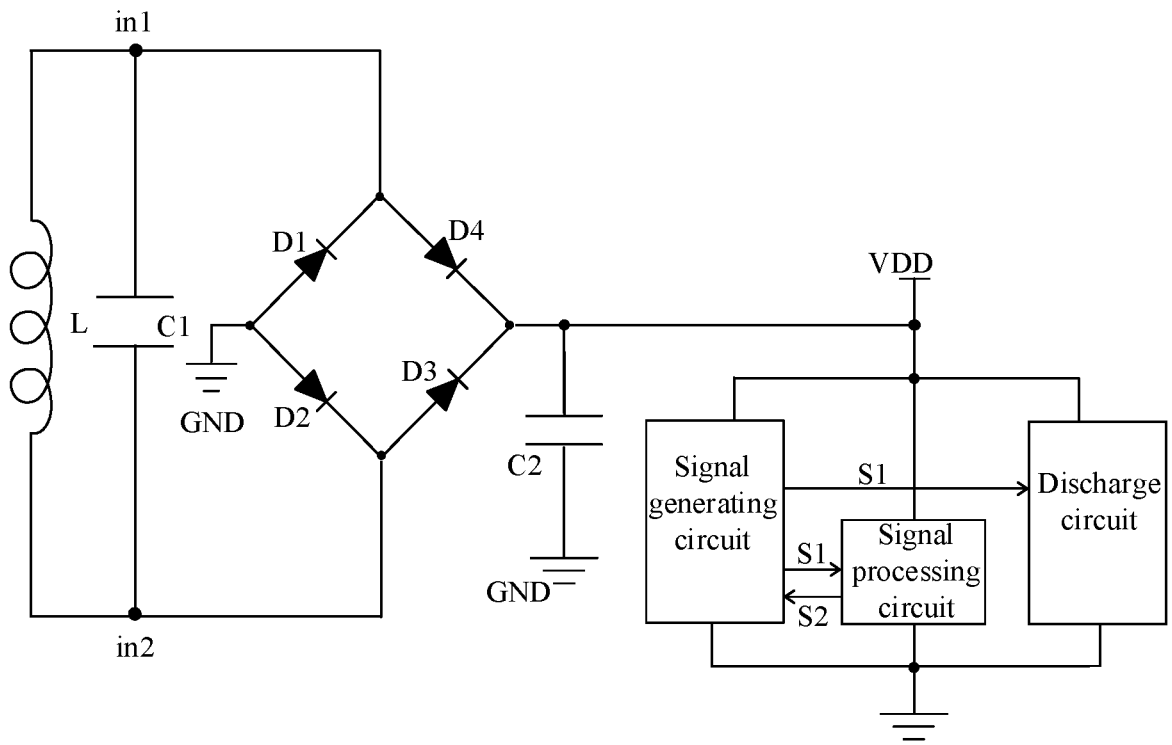
FIG. 1 illustrates a schematic diagram of a circuit structure consistent with Embodiment a of the present disclosure.

Referring to FIG. 1, a positive feedback latch amplitude limiting control circuit of a passive radio frequency identification tag in the present disclosure may include a resonance circuit, a rectifier circuit and an energy storage capacitor C2. The circuit may also include a signal generating circuit, a signal processing circuit and a discharge circuit.

The signal generating circuit may be connected between an output terminal of the rectifier circuit and the ground, may be configured to generate a first control signal S1 that varies with the change of the strength of magnetic field coupled to a coil of the passive RFID tag, to input the first control signal S1 to the signal processing circuit and the discharge circuit, and to receive a logic signal S2 returned by the signal processing circuit.

The signal processing circuit may be connected between the output terminal of the rectifier circuit and the ground, may be configured to receive the first control signal S1, to latch the first control signal S1 to a high level or a low level according to a voltage amplitude of the first control signal S1, to obtain the processed logic signal S2, and to return the logic signal S2 to the signal generating circuit.

The discharge circuit may include a MOS transistor whose gate voltage is indirectly controlled by a latch, and source and drain of the MOS transistor may be respectively connected between the output terminal of the rectifier circuit and the ground. When the strength of magnetic field coupled to the coil of the passive RFID tag is less than a preset value, the first control signal S1 may be pulled down to the ground to maintain the discharge circuit in a turned-off state. When the strength of magnetic field coupled to the coil of the passive RFID tag is greater than the preset value, the first control signal S1 may be set to a high level to turn on the discharge circuit, the charges at the output terminal of the rectifier circuit may be outputted to the ground. The internal positive feedback latch mechanism of the latch may make the first control signal S1 have a substantially strong pull-down driving force when being pulled to a low level, such that the control gate of the discharge path may be fully turned off, which may avoid the discharge state of the MOS transistor being in a sub-threshold region, and may effectively reduce the leakage current in the discharge path, thereby achieving the purposes of saving system power consumption and improving communication performance.

The positive feedback latch amplitude limiting control circuit of the passive radio frequency identification tag in the present disclosure may dynamically rectify and control the voltage between a first antenna terminal and a second antenna terminal. When the voltage between the antenna terminals is too high, the signal generating circuit may generate a high-level signal, and after being processed, a logic low signal may be generated, and the generated high-level signal may be inputted into the discharge circuit to turn on the discharge circuit, such that the charges at the antenna terminal may be outputted to the ground, which may reduce the amount of charges at the antenna terminal and may reduce the rectified DC voltage. When the voltage between the antenna terminals is within the limited voltage, the signal generating circuit may make the signal processing circuit generate a logic high signal, and the correspondingly generated low-level signal may make the discharge circuit in the turned-off state. The rectifier circuit may rectify all the charges at the antenna terminal into DC power for the load circuit, such that the current consumption may be controlled to a certain extent and the system energy loss may be reduced.

Moreover, in the present disclosure, the turn-on and turn-off of the discharge path may be achieved by the output voltage of the latch. The latch circuit may have various forms of implementation, and the core feature of the latch circuit may include that the internal structure thereof may have a latch mechanism with positive feedback gain. Therefore, when being at a high level or at a low level, the output voltage of the latch circuit may have a stronger pull-up or pull-down capability than the output voltage of an ordinary logic circuit, and such feature may often be used for information preservation in electronic systems. In the present disclosure, the latch may be used to control the turn-on and turn-off of the discharge path of the passive RFID tag chip, which may play a role that cannot be achieved by the control voltage outputted by the ordinary logic circuit. For example, when the output voltage of the latch is pulled down to the ground, the pull-down degree may be much greater than the pull-down degree of the output node of the ordinary logic circuit, such that the MOS switch controlled by the pull-down signal may be fully turned off and may not have leakage current due to the perturbation of the ground noise. Such feature may be especially significant in deep sub-micron integrated circuit manufacturing process. In these process nodes, due to the pursuit of low power supply voltage and high-speed switching characteristics, the turn-on threshold voltage of the MOS transistor may be made substantially low, regardless of whether the channel is turned on or not, such that a considerable leakage current may exist in the sub-threshold region, and such leakage current is not conducive to the application of the passive RFID tag.

To examine the effect of turning off the discharge path of such structure from the perspective of pull-down capability alone, compared with the patented technology ZL201410009153.2, namely "Dynamic Rectification Control Circuit and Passive RFID and Dynamic Rectification Control Method", the voltage output of the latch in the present disclosure may have a significantly enhanced pull-down capability than the voltage output generated on a resistor node. Compared with the patented technology ZL201410008854.4, namely "Amplitude limiting Circuit and Passive Radio Frequency Tag Capable of Continuously Adjusting Rectified Signal Amplitude", the determination of the input voltage by the latch may be determined by the latch inversion operation triggered by the turn-on voltage of a threshold device. Compared with another patented technology ZL201410009344.9, namely "Switch Signal-Controlled Rectification and Amplitude Limiting Circuit and Passive Radio Frequency Tag", the pull-down capability of the output voltage of the latch may be affected by the positive feedback gain factors, which may be stronger than the pull-down capability of the voltage outputted by any other logic switch circuit. Compared with the patented technology ZL201410009326.0, namely "Rectifier Amplitude Limiting Circuit and Passive Radio Frequency Tag with Multiple Time Constants", the output voltage of the latch may be a logic signal with a very short time constant, rather than an analog signal with variable amplitude limiting control over time constant.

Figure 2:
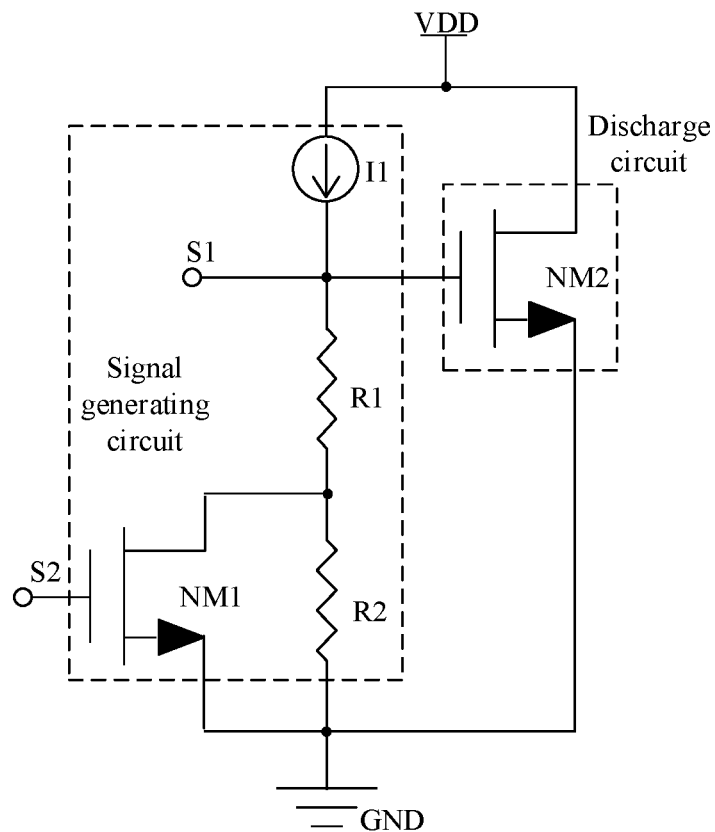
FIG. 2 illustrates a schematic diagram of a signal generating circuit and a discharge circuit consistent with Embodiment 1 of the present disclosure.

FIG. 2 illustrates a schematic diagram of a signal generating circuit and a discharge circuit consistent with Embodiment 1 of the present disclosure. The signal generating circuit may include a first current source I1, a first resistive device R1 and a second resistive device R2 connected in series between the power supply terminal and the ground. A first control signal S1 may be outputted from a node between the first current source I1 and the first resistive device R1. A gate of a first N-type MOS transistor NM1 may be connected to an output terminal of the signal processing circuit, a drain of the first N-type MOS transistor NM1 may be connected to a node between the first resistive device R1 and the second resistive device R2, and a source of the first N-type MOS transistor NM1 may be connected to a node between the second resistive device R2 and the ground. A resistance value of the first resistive device R1 may be much smaller than a resistance value of the second resistive device R2.

The discharge circuit may include a second N-type MOS transistor NM2 connected between an output terminal of the rectifier circuit and the ground. A drain of the second N-type MOS transistor NM2 may be connected to the power supply terminal, a source of the second N-type MOS transistor NM2 may be grounded, and a gate of the second N-type MOS transistor NM2 may be connected to the output terminal of the first current source I1. The N-type MOS transistor NM2 may be configured to turn on the discharge circuit under the control of the first control signal S1 when the strength of magnetic field of the electromagnetic field is too strong, and the charges at the output terminal of the rectifier circuit may be outputted to the ground. Because the gate signal of the discharge circuit, in other words, the first control signal S1, is connected to a terminal of the latch, according to the working principle of the latch, the inherent positive feedback mechanism of the latch may make the first control signal S1 have a substantially strong pull-down driving force when being pulled to a low level, such that the control gate of the discharge path may be fully turned off, to avoid the discharge state of the MOS transistor being in a sub-threshold region, thereby effectively reducing the leakage current in the discharge path, saving system power consumption, and improving communication performance.

Figure 3:
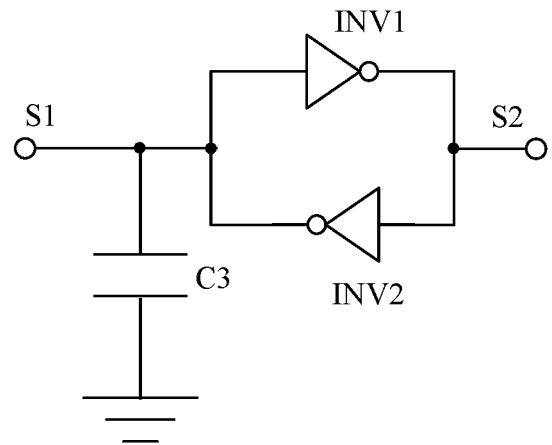
FIG. 3 illustrates a schematic diagram of a first implementation structure of a signal processing circuit consistent with Embodiment 1 of the present disclosure.

FIG. 3 illustrates a schematic diagram of a first implementation structure of a signal processing circuit consistent with Embodiment 1 of the present disclosure. The signal processing circuit may include a capacitive device connected to the ground, such as a third capacitor C3, a first inverting sub-module INV1 and a second inverting sub-module INV2. A positive terminal of the capacitive device may be connected to a latch flip-flop with positive feedback characteristic formed by connecting an output terminal of the first inverting sub-module INV1 and an input terminal of the second inverting sub-module INV2, and connecting an input terminal of the first inverting sub-module INV1 and an output terminal of the second inverting sub-module INV2. The signal processing circuit may convert an analog signal to a digital signal, and may be configured to rapidly convert the first control signal S1 into a high-level or low-level logic signal according to an analog voltage amplitude of the first control signal S1, to obtain a processed logic signal S2, and to return the logic signal S2 to the signal generating circuit.

Figure 4:
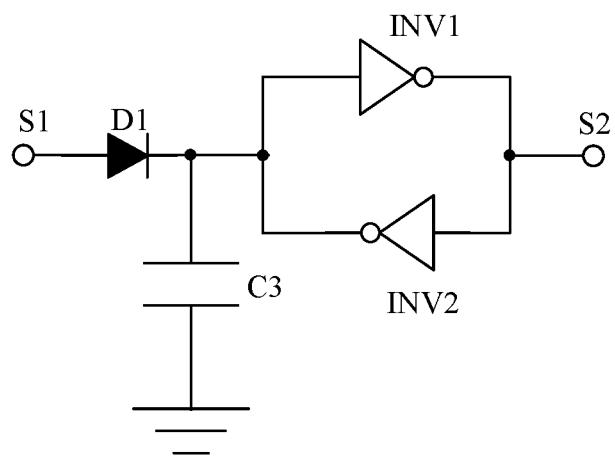
FIG. 4 illustrates a schematic diagram of a second implementation structure of a signal processing circuit consistent with Embodiment 1 of the present disclosure.

FIG. 4 illustrates a schematic diagram of a second implementation structure of a signal processing circuit consistent with Embodiment 1 of the present disclosure. The signal processing circuit may include a detector circuit formed by at least one unidirectional conducting device with a threshold voltage, such as a diode D1, and a capacitive device, such as the third capacitor C3, and the first inverting sub-module INV1 and the second inverting sub-module INV2. An output terminal of the detector circuit may be connected to the latch flip-flop with positive feedback characteristic formed by connecting an output terminal of the first inverting sub-module INV1 and an input terminal of the second inverting sub-module INV2, and connecting an input terminal of the first inverting sub-module INV1 and an output terminal of the second inverting sub-module INV2. The signal processing circuit may convert an analog signal to a digital signal, and may be configured to rapidly convert the first control signal S1 into a high-level or low-level logic signal according to an analog voltage amplitude of the first control signal S1, to obtain the processed logic signal S2, and to return the logic signal S2 to the signal generating circuit.

In the first and second implementation structures of the above-disclosed signal processing circuit, the inverting sub-module may adopt the inverting sub-module circuit with simplest form formed by a PMOS transistor and an NMOS transistor connected in series. Similarly, the inverting sub-module may also adopt a logic circuit with equivalent logic inversion function and formed by AND gate, NAND gate, OR gate, NOR gate, and XOR gate, or an analog circuit with equivalent logic inversion function and formed by analog differential amplifier. The latch may also be extended to a latch structure with positive feedback characteristics and positive feedback connection in general form, such as a latch structure formed by driving a positive feedback load with a differential pair transistor.

The difference between the second implementation structure and the first implementation structure may include that the unidirectional conducting device with a threshold voltage may be added in the front end of the latch flip-flop. Therefore, on the basis of the first implementation structure, the conduction voltage value of the first control signal S1 may increase. In the first implementation structure, when the first control signal S1 rises to a turn-on voltage of the inverting sub-module, the logic signal S2 outputted by the signal processing circuit may be a low level "0". In the second implementation structure, only when the voltage value of the first control signal S1 rises to a sum of the threshold voltage of the threshold device and the turn-on voltage of the inverting sub-module, the logic signal S2 outputted by the signal processing circuit may be a low level "0". Therefore, different quantities of threshold devices may be selected and connected according to circuit design requirements, product usage requirements and other parameters (the quantity of threshold devices may not only be determined during circuit design, but also be capable of being changed later by laser trimming process).

According to the above discussion, when the field strength is too strong, the first control signal S1 may be at a high level, the logic signal S2 may be at a low level, the first N-type MOS transistor NM1 may remain in a turned-off state, and the voltage value $V_{S1}=I_1*(R_1+R_2)$ of the first control signal S1 may be at a high level, such that the second N-type MOS transistor NM2 may be turned on for discharging. When the first control signal S1 is at a low level, the logic signal S2 may be at a high level, the first N type MOS transistor NM1 may be turned on to short-circuit the second resistive device R2. In view of this, the voltage value of the first control signal S1 may be $V_{S1}'=I_1*R_1$, because the resistance value of the first resistive device R1 is much smaller than the resistance value of the second resistive device R2, $V_{S1}'$ may be much smaller than $V_{S1}$ and may be a low-level signal, such that the second N-type MOS transistor NM2 may be in a turned-off state to stop discharging.

A working principle of the above-disclosed graded amplitude limiting control circuit of the passive RFID tag may include following. The LC resonance circuit may collect the energy from the electromagnetic field emitted by the card reader, and the energy may be rectified by the rectifier circuit to supply power to the system internal circuit. The signal generating circuit may generate the first control signal S1 that varies with the change of the strength of magnetic field of the electromagnetic field, which may be inputted into the signal processing circuit and the discharge circuit. The stronger the strength of magnetic field, the higher the first control signal S1, and vice versa. When the first control signal S1 is substantially high, the signal processing circuit may output a low-level logic signal S2 to return to the signal generating circuit, such that the first N-type MOS transistor NM1 in the signal generating circuit may remain in the turned-off state, and the first control signal S1 may maintain a high potential. Therefore, the second N-type MOS transistor NM2 in the discharge circuit may be turned on, the discharge circuit may be in a discharge state, and the charges at the antenna terminal may be outputted to the ground. When the electromagnetic field weakens to a certain extent, the first control signal S1 may be reduced to a certain extent. In view of this, the signal processed by the signal processing circuit may be inverted, the logic signal S2 may jump from a low level to a high level, the first N-type MOS transistor NM1 may be turned on, the second resistor R2 may be short-circuited by the first N-type MOS transistor NM1, and the first control signal S1 may be pulled down. In view of this, the second N-type MOS transistor NM2 may be in a turned-off state to stop discharging, and the system current consumption may be reduced.

Embodiment 2

Figure 5:
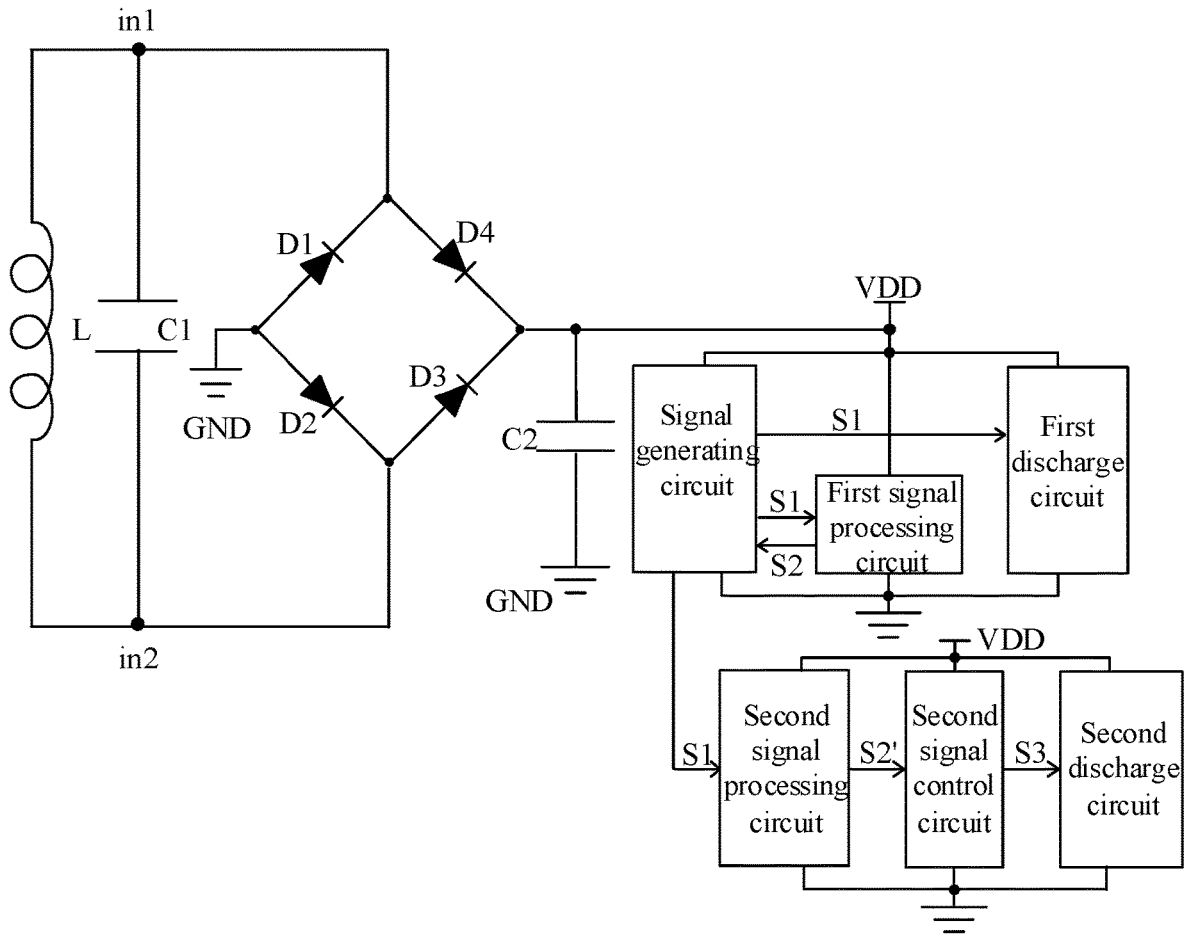
FIG. 5 illustrates a schematic diagram of a circuit structure consistent with Embodiment 2 of the present disclosure.

FIG. 5 illustrates a schematic diagram of a circuit structure consistent with Embodiment 2 of the present disclosure. In one embodiment, the positive feedback latch amplitude limiting control circuit may include a resonance circuit, a rectifier circuit and an energy storage capacitor C2. The positive feedback latch amplitude limiting control circuit may further include the signal generating circuit, a first signal processing circuit, a first discharge circuit, a second signal processing circuit, a second signal control circuit and a second discharge circuit.

The signal generating circuit may be connected between the output terminal of the rectifier circuit and the ground, and may be configured to generate the first control signal S1 that varies with the change of the strength of the magnetic field coupled to the coil of the passive RFID tag, and to input the first control signal S1 to the first signal processing circuit, the first discharge circuit, and the second signal processing circuit, and to receive the logic signal S2 returned by the first signal processing circuit.

The first signal processing circuit may be connected between the output terminal of the rectifier circuit and the ground, and may be configured to receive the first control signal S1, to latch the first control signal S1 to a high level or a low level according to the voltage amplitude of the first control signal S1, to obtain the processed logic signal S2, and to return the logic signal S2 to the signal generating circuit.

The first discharge circuit may include a MOS transistor whose gate voltage is indirectly controlled by the latch, and source and drain of the MOS transistor may be respectively connected between the output terminal of the rectifier circuit and the ground. When the strength of magnetic field coupled to the coil of the passive RFID tag is less than a preset value, the first control signal S1 may be pulled down to the ground to maintain the discharge circuit in a turned-off state. When the strength of magnetic field coupled to the coil of the passive RFID tag is greater than the preset value, the first control signal S1 may be set to a high level to turn on the discharge circuit, the charges at the output terminal of the rectifier circuit may be outputted to the ground. The internal positive feedback latch mechanism of the latch may make the first control signal S1 have a substantially strong pull-down driving force when being pulled to a low level, such that the control gate of the discharge path may be fully turned off, which may avoid the discharge state of the MOS transistor being in a sub-threshold region.

The second signal processing circuit may be connected between the output terminal of the rectifier circuit and the ground, and may be configured to receive the first control signal S1, to latch the first control signal S1 to a high level or a low level according to the voltage amplitude of the first control signal S1, to obtain a processed logic signal S2', and to input the logic signal S2' to the second signal control circuit.

The second signal control circuit may be connected between the output terminal of the rectifier circuit and the ground, and may be configured to generate a second control signal S3 according to the high-level or low-level of the logic signal S2', and to input the second control signal S3 to the second discharge circuit.

The second discharge circuit may include a MOS transistor whose gate voltage is indirectly controlled by the latch, and source and drain of the MOS transistor may be respectively connected between the output terminal of the rectifier circuit and the ground. When the strength of magnetic field coupled to the coil of the passive RFID tag is less than a preset value, the first control signal S1 may be pulled down to the ground to maintain the discharge circuit in a turned-off state. When the strength of magnetic field coupled to the coil of the passive RFID tag is greater than the preset value, the first control signal S1 may be set to a high level to turn on the discharge circuit, the charges at the output terminal of the rectifier circuit may be outputted to the ground. The internal positive feedback latch mechanism of the latch may make the first control signal S1 have a substantially strong pull-down driving force when being pulled to a low level, such that the control gate of the discharge path may be fully turned off, which may avoid the discharge state of the MOS transistor being in a sub-threshold region.

The first signal processing circuit may include a capacitive device connected to the ground, the first inverting sub-module INV1 and the second inverting sub-module INV2. The positive terminal of the capacitive device may be connected to the latch flip-flop with positive feedback characteristic formed by connecting an output terminal of the first inverting sub-module INV1 and an input terminal of the second inverting sub-module INV2, and connecting an input terminal of the first inverting sub-module INV1 and an output terminal of the second inverting sub-module INV2. The second signal processing circuit may include a detector circuit formed by at least one unidirectional conduction threshold device and a capacitive device, a third inverting sub-module INV3 and a fourth inverting sub-module INV4. An output terminal of the detector circuit may be connected to the latch flip-flop with positive feedback characteristic formed by connecting an output terminal of the third inverting sub-module INV3 and an input terminal of the fourth inverting sub-module INV4, and connecting an input terminal of the first third inverting sub-module INV3 and an output terminal of the fourth inverting sub-module INV4.

Figure 6:
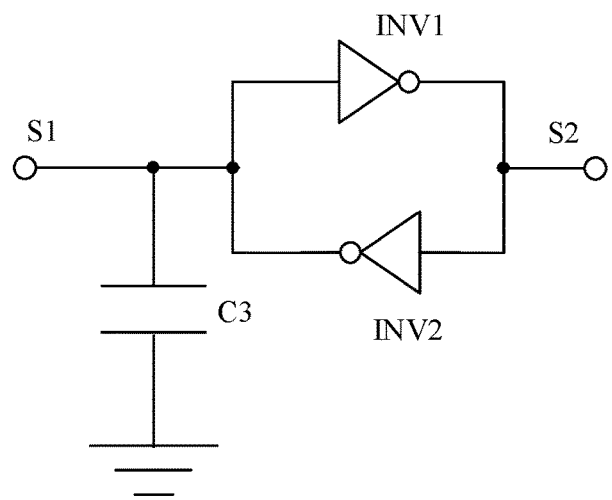
FIG. 6 illustrates a schematic diagram of a first signal processing circuit consistent with Embodiment 2 of the present disclosure.

In one embodiment, the signal generating circuit, the first signal processing circuit and the first discharge circuit may adopt the same structure as the signal generating circuit, the signal processing circuit and the discharge circuit described in Embodiment 1, which may not be repeated herein. It should be particularly noted that the signal processing circuit may adopt the first implementation structure in Embodiment 1, in other words, a threshold-free device structure, as shown in FIG. 6.

In present technical solution, the graded amplitude limiting may be achieved by parallel connecting more than one signal processing circuit, namely the first signal processing circuit and the second signal processing circuit, and parallel processing the first control signal S1 generated by the signal generating circuit and representing the strength of the coupling field. Because the second signal processing circuit has at least one more unidirectional conducting device with a threshold voltage than the first signal processing circuit, the second signal processing circuit may have a higher flip voltage of the latch than the first signal processing circuit, in other words, a higher amplitude limiting voltage may be required to turn on the second discharge circuit. In fact, the flip voltage of the latch in the first signal processing circuit may be the flip voltage of the inverting sub-module in the latch. If the inverting sub-module is simply composed of PMOS and NMOS connected in series, the flip voltage may be a threshold voltage of the NMOS transistor. Due to the existence of a unidirectional conducting device with a threshold voltage in the second signal processing circuit, the flip voltage may become a sum of the threshold voltage of the added threshold device and the flip voltage of the inverting sub-module corresponding to the latch in the second signal processing circuit.

Figure 7:
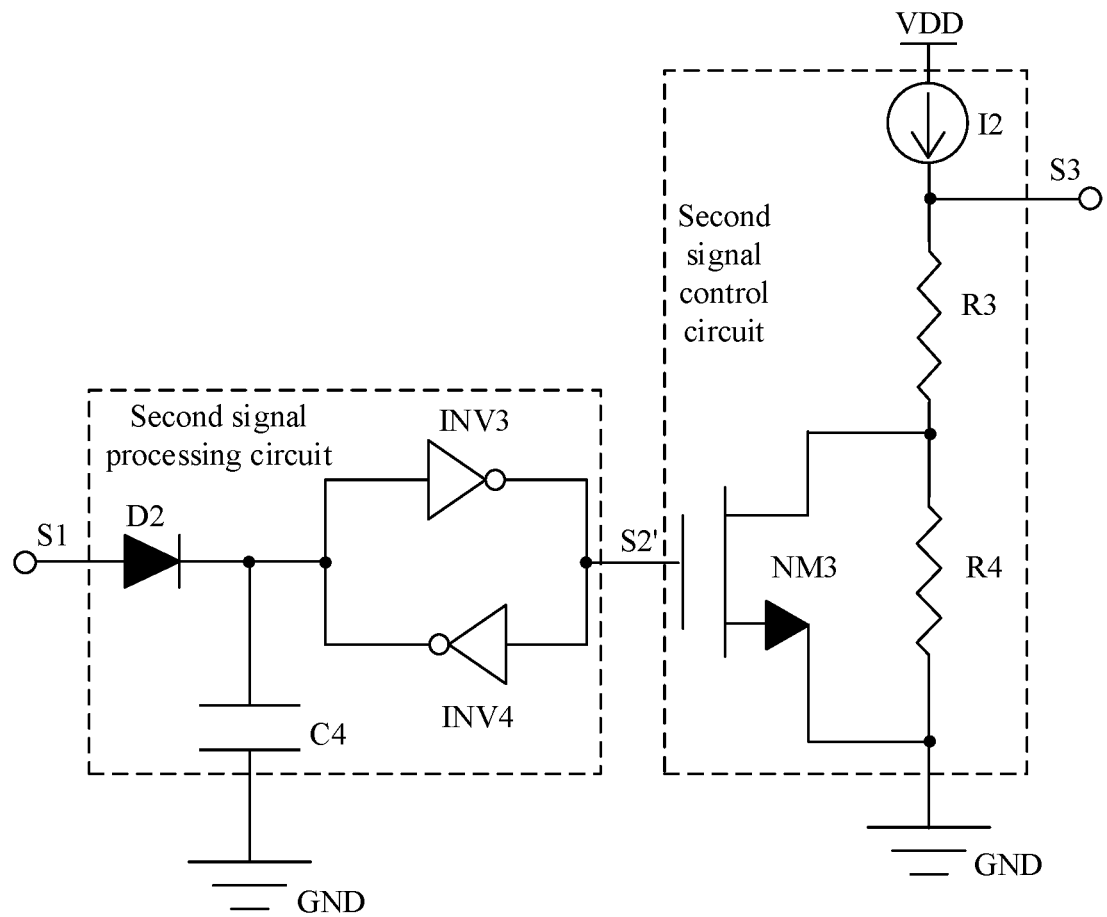
FIG. 7 illustrates a schematic diagram of a second signal processing circuit and a second signal control circuit consistent with Embodiment 2 of the present disclosure.

FIG. 7 illustrates a schematic diagram of the second signal processing circuit and the second signal control circuit consistent with Embodiment 2 of the present disclosure. The second signal processing circuit may include a detector circuit formed by at least one unidirectional conducting device with a threshold voltage, such as a diode D2, and a capacitive device, such as a fourth capacitor C4, the third inverting sub-module INV3 and the fourth inverting sub-module INV4. The output terminal of the detector circuit may be connected to the latch flip-flop with positive feedback characteristic formed by connecting an output terminal of the third inverting sub-module INV3 and an input terminal of the fourth inverting sub-module INV4, and connecting an input terminal of the third inverting sub-module INV3 and an output terminal of the fourth inverting sub-module INV4. The second signal processing circuit may convert an analog signal to a digital signal, and may be configured to rapidly convert the first control signal S1 into a high-level or low-level logic signal according to the analog voltage amplitude of the first control signal S1, to obtain the processed logic signal S2', and to return the logic signal S2' to the signal generating circuit.

The second signal control circuit may include a second current source 12, a third resistive device R3 and a fourth resistive device R4 connected in series between the power supply terminal and the ground. A second control signal S3 may be outputted from a node between the second current source 12 and the third resistive device R3. A gate of a switch device, in other words, a third N-type MOS transistor NM3, may be connected to an output terminal of the second signal processing circuit, a drain of the third N-type MOS transistor NM3 may be connected to a node between the third resistive device R3 and the fourth resistive device R4, and a source of the third N-type MOS transistor NM3 may be connected to a node between the fourth resistive device R4 and the ground. A resistance value of the third resistive device R3 may be much smaller than a resistance value of the fourth resistive device R4.

Because the input signal S1 of the second signal processing circuit still has a little ripple fluctuation, the signal S1 may become an analog voltage with a smooth amplitude after passing through the detector circuit. When the voltage value of the signal S1 is greater than the turn-on voltage of the latch flip-flop, the latch flip-flop may quickly flip to generate the logic signal S2'. The logic signal S2' may control the turn-on and turn-off of the switch device NM3, thereby determining whether the resistive device R4 is short-circuited, in other words, determining the amplitude of the signal S3.

Figure 8:
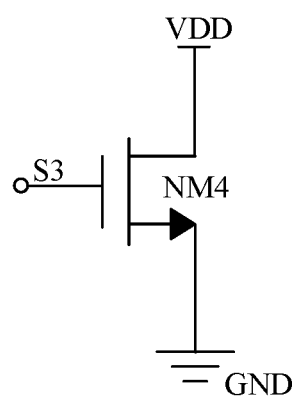
FIG. 8 illustrates a schematic diagram of a second discharge circuit consistent with Embodiment 2 of the present disclosure.

FIG. 8 illustrates a schematic diagram of a second discharge circuit consistent with Embodiment 2 of the present disclosure. The second discharge circuit may include a fourth N-type MOS transistor NM4 connected between the output terminal of the rectifier circuit and the ground. The drain of the fourth N-type MOS transistor NM4 may be connected to the power supply terminal, the source of the fourth N-type MOS transistor NM4 may be connected to the ground, and the gate of the fourth N-type MOS transistor NM4 may be connected to the output terminal of the second signal control circuit. Under the control of the second control signal S3, when the strength of magnetic field of the electromagnetic field is too strong, the second discharge circuit may be turned on, and the charges at the output terminal of the rectifier circuit may be outputted to the ground. Because the gate signal of the discharge circuit, in other words, the first control signal S1 is one terminal of the latch, according to the working principle of the latch, the internal positive feedback latch mechanism of the latch may make the first control signal S1 have a substantially strong pull-down driving force when being pulled to a low level, such that the control gate of the discharge path may be fully turned off, which may avoid the discharge state of the MOS transistor NM4 being in a sub-threshold region, and may effectively reduce the leakage current in the discharge path, thereby saving system power consumption and improving communication performance.

In one embodiment, a structure in which two discharge paths are connected in parallel may be adopted. Because the first discharge path does not include a threshold device, when the first control signal S1 is higher than the turn-on voltage of the first inverting sub-module and the second inverting sub-module, the logic signal S2 may output a low level "0", and the discharge circuit in the unit may begin to discharge. In view of this, in the second discharge path, due to the blocking effect of the threshold device, the first control signal S1 may be lower than the sum of the threshold voltage and the turn-on voltage of the third inverting sub-module and the fourth inverting sub-module, the logic signal S2' may maintain a high level "1", such that the discharge path may be in a turned-off state. Merely when the first control signal S1 continues to rise to a value greater than the sum of the threshold voltage of the threshold device and the turn-on voltage of the inverting sub-module, the second discharge path may be turned on to discharge.

Therefore, in the circuit design, parameters such as the impedance value of the resistive device, the threshold value of the threshold device, and the width-to-length ratio of the N-type MOS transistor in the two discharge paths connected in parallel may be optimized, such that the two discharge paths may have different amplitude limiting leakage points and different current leakage capabilities, thus playing the role of graded amplitude limiting. In the circuit design and use process, the parameters of each discharge path device may be adjusted according to the use environment of the circuit and product requirements, to achieve the optimal energy harvesting and discharge scheme, thereby maximizing the product performance.

The present disclosure also provides a method of using the above disclosed positive feedback latch amplitude limiting control circuit to perform graded amplitude limiting control. The method may include following steps.

S1: A resonance circuit may be coupled with an external magnetic field to generate an alternating current and may input the alternating current to the rectifier circuit, the rectifier circuit may rectify the alternating current into a direct current and may output the direct current to each circuit module including the signal generating circuit, the signal processing circuit and the discharge circuit.

S2: The signal generating circuit may generate the first control signal S1 that varies with the change of the strength of magnetic field coupled to the coil of the passive RFID tag, and the first control signal S1 may be inputted to the signal processing circuit. When the voltage value of the first control signal S1 is too low to drive the inverting sub-module in the signal processing circuit to be turned on, the logic signal S2 outputted by the signal processing circuit may be a high level "1". When the voltage value of the first control signal S1 gradually increases to the turn-on voltage of the inverting sub-module, the logic signal S2 outputted by the signal processing circuit may be a low level "0". The signal processing circuit may return the logic signal S2 of the high level "1" or the low level "0" to the signal generating circuit.

S3: When the inputted logic signal S2 is the high level "1", the first N-type MOS transistor in the signal generating circuit may be turned on, the second resistive device may be short-circuited. Because the resistance value of the first resistive device is far smaller than the resistance value of the second resistive device, the first control signal S1 may be rapidly pulled down to a low level signal, such that the second N-type MOS transistor in the discharge circuit may be turned off, and the discharge path may maintain the turned-off state. When the inputted logic signal S2 is the low level "0", the first N-type MOS transistor may be turned off, and the first control signal S1 may maintain a high-level signal, such that the second N-type MOS transistor in the discharge circuit may be turned on, the discharge path may be switched from the turned-off state to the turned-on state, and the charges at the antenna terminal may be outputted to the ground.

When the positive feedback latch amplitude limiting control circuit adopts the structure described in Embodiment 2 of the present disclosure, the graded amplitude limiting control method may include following steps.

S1: A resonance circuit may be coupled with an external magnetic field to generate an alternating current and may input the alternating current to the rectifier circuit, the rectifier circuit may rectify the alternating current into a direct current and may output the direct current to each circuit module including the signal generating circuit, the first signal processing circuit, the first discharge circuit, the second signal processing circuit, the second signal control circuit and the second discharge circuit.

S2: The signal generating circuit may generate the first control signal S1 that varies with the change of the strength of magnetic field coupled to the coil of the passive RFID tag, and the first control signal S1 may be inputted to the first signal processing circuit and the second signal processing circuit, respectively. When the voltage value of the first control signal S1 is too low to drive the inverting sub-module in the first signal processing circuit to be turned on, the logic signal S2 outputted by the first signal processing circuit may be a high level "1". When the voltage value of the first control signal S1 gradually increases to the turn-on voltage of the inverting sub-module in the first signal processing circuit, the logic signal S2 outputted by the first signal processing circuit may be a low level "0". The first signal processing circuit may return the above logic signal S2 of the high level "1" or the low level "0" to the signal generating circuit. When the voltage value of the first control signal S1 is lower than the sum of the threshold voltage of the unidirectional conducting device with a threshold voltage and the turn-on voltage of the inverting sub-module in the second signal processing circuit, the logic signal S2' outputted by the second signal processing circuit may be a high level "1". When the voltage value of the first control signal S1 gradually increases to the sum of the threshold voltage of the threshold device and the turn-on voltage of the inverting sub-module in the second signal processing circuit, the logic signal S2' outputted by the second signal processing circuit may be a low level "0". The second signal processing circuit may input the above logic signal S2' of the high level "1" or the low level "0" to the second signal control circuit.

S3: When the inputted logic signal S2 is the high level "1", the first N-type MOS transistor in the signal generating circuit may be turned on, the second resistive device may be short-circuited. Because the resistance value of the first resistive device is far smaller than the resistance value of the second resistive device, the first control signal S1 may be rapidly pulled down to a low level signal, such that the second N-type MOS transistor in the first discharge circuit may be turned off, and the first discharge path may maintain the turned-off state. When the inputted logic signal S2 is the low level "0", the first N-type MOS transistor may be turned off, and the first control signal S1 may maintain a high-level signal, such that the second N-type MOS transistor may be turned on, the first discharge path may be switched from the turned-off state to the turned-on state, and the charges at the antenna terminal may be outputted to the ground. When the inputted logic signal S2' is the high level "1", the third N-type MOS transistor in the second signal control circuit may be turned on, and the fourth resistive device may be short-circuited. Because the resistance value of the third resistive device is far smaller than the resistance value of the fourth resistive device, the second control signal S3 may be rapidly pulled down to a low level signal, such that the fourth N-type MOS transistor in the second discharge circuit may be turned off, and the second discharge path may maintain the turned-off state. When the inputted logic signal S2' is the low level "0", the third N-type MOS transistor may be turned off, and the third control signal S3 may maintain a high-level signal, such that the fourth N-type MOS transistor may be turned on, the second discharge path may be switched from the turned-off state to the turned-on state, and the charges at the antenna terminal may be outputted to the ground.

In the above-disclosed graded amplitude limiting control method, when the field strength changes from weak to strong (in other words, the chip approaches the card reader from far to near), the step S2 may include following states.

a: When 0<S1<the turn-on voltage of the first inverting sub-module and the second inverting sub-module, both the logic signal S2 and the logic signal S2' may be the high level "1", and both the first discharge path and the second discharge path may maintain the turned-off state.

b: When the turn-on voltage of the first inverting sub-module and the second inverting sub-module≤S1<the sum of the threshold voltage and the turn-on voltage of the third inverting sub-module and the fourth inverting sub-module, the logic signal S2 may be the low level "0", the logic signal S2' may be the high level "1", the first discharge path may be in the turned-on state to maintain discharging, and the second discharge path may maintain the turned-off state.

c: When the sum of the threshold voltage and the turn-on voltage of the third inverting sub-module and the fourth inverting sub-module≤S1, both the logic signal S2 and the logic signal S2' may be the low level "0", and both the first discharge path and the second discharge path may be turned on to maintain discharging.

When the field strength changes from strong to weak (in other words, the chip moves away from the card reader), the step S2 may include following states.

a': When the sum of the threshold voltage and the turn-on voltage of the third inverting sub-module and the fourth inverting sub-module≤S1, both the logic signal S2 and the logic signal S2' may be the low level "0", and both the first discharge path and the second discharge path may be turned on to maintain discharging.

b': When the turn-on voltage of the first inverting sub-module and the second inverting sub-module≤S1<the sum of the threshold voltage and the turn-on voltage of the third inverting sub-module and the fourth inverting sub-module, the logic signal S2 may be the low level "0", the logic signal S2' may be the high level "1", the first discharge path may be in the turned-on state to maintain discharging, and the second discharge path may maintain the turned-off state.

c': When 0<S1<the turn-on voltage of the first inverting sub-module and the second inverting sub-module, both the logic signal S2 and the logic signal S2' may be the high level "1", and both the first discharge path and the second discharge path may maintain the turned-off state.

What is claimed is:

1. A positive feedback latch amplitude limiting control circuit of a passive radio frequency identification (RFID) tag, the circuit comprising: a signal generating circuit, a signal processing circuit and a discharge circuit, wherein:

the signal generating circuit is connected between an output terminal of a rectifier circuit and ground, and is configured to: generate a first control signal S1 that varies with change of strength of a magnetic field coupled to a coil of the passive RFID tag, input the first control signal S1 to the signal processing circuit and the discharge circuit, and receive a logic signal S2 returned by the signal processing circuit, the signal processing circuit is connected between the output terminal of the rectifier circuit and the ground, and is configured to: receive the first control signal S1, latch the first control signal S1 to a high level or a low level according to a voltage amplitude of the first control signal S1, obtain the processed logic signal S2, and return the logic signal S2 to the signal generating circuit, and the discharge circuit includes a MOS transistor whose gate voltage is indirectly controlled by a latch, and source and drain of the MOS transistor are respectively connected between the output terminal of the rectifier circuit and the ground, wherein: when the strength of the magnetic field coupled to the coil of the passive RFID tag is less than a preset value, the first control signal S1 is pulled down to the ground to maintain the discharge circuit in a turned-off state; when the strength of the magnetic field coupled to the coil of the passive RFID tag is greater than the preset value, the first control signal S1 is set to a high level to turn on the discharge circuit, and charges at the output terminal of the rectifier circuit are outputted to the ground; and an internal positive feedback latch mechanism of the latch makes the first control signal S1 have a substantially strong pull-down driving force when being pulled to a low level, such that a control gate of the discharge path is fully turned off, which avoids a discharge state of a sub-threshold region, and effectively reduces a leakage current in the discharge path, thereby achieving purposes of saving system power consumption and improving communication performance.

2. The positive feedback latch amplitude limiting control circuit of the RFID tag according to claim 1, wherein the signal generating circuit includes a first current source I1, a first resistive device and a second resistive device that are connected in series between a power supply terminal and the ground, wherein: the first control signal S1 is outputted from a node between the first current source I1 and the first resistive device, a gate of a first N-type MOS transistor is connected to an output terminal of the signal processing circuit, a drain thereof is connected to a node between the first resistive device and the second resistive device, and a source thereof is connected to a node between the second resistive device and the ground; and a resistance value of the first resistive device is much smaller than a resistance value of the second resistive device; and the discharge circuit includes a MOS transistor whose gate is controlled, and source and drain thereof are respectively connected between the power supply terminal and the ground, wherein: when the strength of the magnetic field coupled to the coil of the passive RFID tag is less than the preset value, the first control signal S1 is pulled down to the ground to maintain the discharge circuit in the turned-off state; and when the strength of the magnetic field coupled to the coil of the passive RFID tag is greater than the preset value, the first control signal S1 is set to the high level to turn on the discharge circuit, and charges at the output terminal of the rectifier circuit are outputted to the ground.

3. The positive feedback latch amplitude limiting control circuit of the RFID tag according to claim 1, wherein: the signal processing circuit includes a capacitive device connected to the ground, a first inverting sub-module INV1 and a second inverting sub-module INV2, wherein: a positive terminal of the capacitive device is connected to a latch flip-flop with positive feedback characteristic formed by connecting an output terminal of the first inverting sub-module INV1 and an input terminal of the second inverting sub-module INV2, and connecting an input terminal of the first inverting sub-module INV1 and an output terminal of the second inverting sub-module INV2; and the signal processing circuit converts an analog signal to a digital signal, and is configured to: rapidly convert the first control signal S1 into a high-level or low-level logic signal according to an analog voltage amplitude of the first control signal S1, obtain the processed logic signal S2, and return the logic signal S2 to the signal generating circuit.

4. The positive feedback latch amplitude limiting control circuit of the RFID tag according to claim 1, wherein: the signal processing circuit includes a detector circuit formed by at least one unidirectional conduction threshold device and a capacitive device, a first inverting sub-module INV1 and a second inverting sub-module INV2, wherein: an output terminal of the detector circuit is connected to a latch flip-flop with positive feedback characteristic formed by connecting an output terminal of the first inverting sub-module INV1 and an input terminal of the second inverting sub-module INV2, and connecting an input terminal of the first inverting sub-module INV1 and an output terminal of the second inverting sub-module INV2; and the signal processing circuit converts an analog signal to a digital signal, and is configured to: rapidly convert the first control signal S1 into a high-level or low-level logic signal according to an analog voltage amplitude of the first control signal S1, obtain the processed logic signal S2, and return the logic signal S2 to the signal generating circuit.

5. A method of using the above disclosed positive feedback latch amplitude limiting control circuit in claim 1 to perform a graded amplitude limiting control, the method comprising following steps:

S1: a resonance circuit is coupled with an external magnetic field to generate an alternating current and inputs the alternating current to the rectifier circuit, and the rectifier circuit rectifies the alternating current into a direct current and outputs the direct current to each circuit module including the signal generating circuit, the signal processing circuit and the discharge circuit;

S2: the signal generating circuit generates the first control signal S1 that varies with the change of the strength of the magnetic field coupled to the coil of the passive RFID tag, and inputs the first control signal S1 to the signal processing circuit, wherein: when the voltage value of the first control signal S1 is too low to drive the inverting sub-module in the signal processing circuit to be turned on, the logic signal S2 outputted by the signal processing circuit is a high level "1"; when the voltage value of the first control signal S1 gradually increases to the turn-on voltage of the inverting sub-module, the logic signal S2 outputted by the signal processing circuit is a low level "0"; and the signal processing circuit returns the logic signal S2 of the high level "1" or the low level "0" to the signal generating circuit; and S3: when the inputted logic signal S2 is the high level "1", the first N-type MOS transistor in the signal generating circuit is turned on, and the second resistive device is short-circuited; because the resistance value of the first resistive device is far smaller than the resistance value of the second resistive device, the first control signal S1 is rapidly pulled down to a low level signal, such that the second N-type MOS transistor in the discharge circuit is turned off, and the discharge path maintains the turned-off state; when the inputted logic signal S2 is the low level "0", the first N-type MOS transistor is turned off, and the first control signal S1 maintains a high-level signal, such that the second N-type MOS transistor in the discharge circuit is turned on, the discharge path is switched from the turned-off state to the turned-on state, and the charges at an antenna terminal are outputted to the ground.

6. A positive feedback latch amplitude limiting control circuit of a passive radio frequency identification (RFID) tag, the circuit comprising a signal generating circuit, a first signal processing circuit, a first discharge circuit, a second signal processing circuit, a second signal control circuit and a second discharge circuit, wherein:

the signal generating circuit is connected between an output terminal of a rectifier circuit and ground, and is configured to: generate a first control signal S1 that varies with change of strength of a magnetic field coupled to a coil of the passive RFID tag, input the first control signal S1 to the first signal processing circuit, the first discharge circuit, and the second signal processing circuit, and receive a logic signal S2 returned by the first signal processing circuit;

the first signal processing circuit is connected between the output terminal of the rectifier circuit and the ground, and is configured to: receive the first control signal S1, latch the first control signal S1 to a high level or a low level according to a voltage amplitude of the first control signal S1, obtain the processed logic signal S2, and return the logic signal S2 to the signal generating circuit;

the first discharge circuit includes a MOS transistor whose gate voltage is indirectly controlled by a latch, and source and drain thereof are respectively connected between the output terminal of the rectifier circuit and the ground, wherein: when the strength of the magnetic field coupled to the coil of the passive RFID tag is less than a preset value, the first control signal S1 is pulled down to the ground to maintain the first discharge circuit in a turned-off state; when the strength of the coupled magnetic field is greater than the preset value, the first control signal S1 is set to a high level to turn on the discharge circuit, and charges at the output terminal of the rectifier circuit are outputted to the ground; and an internal positive feedback latch mechanism of the latch makes the first control signal S1 have a substantially strong pull-down driving force when being pulled to a low level, such that a control gate of the discharge path is fully turned off, which avoids the discharge state of a sub-threshold region;

the second signal processing circuit is connected between the output terminal of the rectifier circuit and the ground, and is configured to: receive the first control signal S1, latch the first control signal S1 to the high level or the low level according to the voltage amplitude of the first control signal S1, obtain a processed logic signal S2', and input the logic signal S2' to the second signal control circuit;

the second signal control circuit is connected between the output terminal of the rectifier circuit and the ground, and is configured to: generate a second control signal S3 according to the high-level or low-level of the logic signal S2', and input the second control signal S3 to the second discharge circuit;

the second discharge circuit includes a MOS transistor whose gate voltage is indirectly controlled by the latch, and source and drain thereof are respectively connected between the output terminal of the rectifier circuit and the ground, wherein: when the strength of the magnetic field coupled to the coil of the passive RFID tag is less than a preset value, the first control signal S1 is pulled down to the ground to maintain the discharge circuit in the turned-off state; when the strength of the coupled magnetic field is greater than the preset value, the first control signal S1 is set to a high level to turn on the discharge circuit, and the charges at the output terminal of the rectifier circuit are outputted to the ground; and an internal positive feedback latch mechanism of the latch makes the first control signal S1 have a substantially strong pull-down driving force when being pulled to the low level, such that a control gate of the discharge path is fully turned off, which avoids the discharge state of the sub-threshold region; and the first signal processing circuit includes a capacitive device connected to the ground, a first inverting sub-module INV1 and a second inverting sub-module INV2, wherein a positive terminal of the capacitive device is connected to a latch flip-flop with positive feedback characteristic formed by connecting an output terminal of the first inverting sub-module INV1 and an input terminal of the second inverting sub-module INV2, and connecting an input terminal of the first inverting sub-module INV1 and an output terminal of the second inverting sub-module INV2; and the second signal processing circuit includes a detector circuit formed by at least one unidirectional conduction threshold device and a capacitive device, a third inverting sub-module INV3 and a fourth inverting sub-module INV4, wherein an output terminal of the detector circuit is connected to a latch flip-flop with positive feedback characteristic formed by connecting an output terminal of the third inverting sub-module INV3 and an input terminal of the fourth inverting sub-module INV4, and connecting an input terminal of the third inverting sub-module INV3 and an output terminal of the fourth inverting sub-module INV4.

7. The positive feedback latch amplitude limiting control circuit of the RFID tag according to claim 6, wherein: the second signal control circuit includes a second current source, a third resistive device and a fourth resistive device that are connected in series between the power supply terminal and the ground, wherein: a second control signal S3 is outputted from a node between the second current source and the third resistive device; a gate of a third N-type MOS transistor is connected to an output terminal of the second signal processing circuit, a drain thereof is connected to a node between the third resistive device and the fourth resistive device, and a source thereof is connected to a node between the fourth resistive device and the ground; and a resistance value of the third resistive device is much smaller than a resistance value of the fourth resistive device.

8. A method of using the above disclosed positive feedback latch amplitude limiting control circuit in claim 6 to perform a graded amplitude limiting control, the method comprising following steps:

S1: a resonance circuit is coupled with an external magnetic field to generate an alternating current and inputs the alternating current to the rectifier circuit, and the rectifier circuit rectifies the alternating current into a direct current and outputs the direct current to each circuit module including the signal generating circuit, the first signal processing circuit, the first discharge circuit, the second signal processing circuit, the second signal control circuit and the second discharge circuit;

S2: the signal generating circuit generates the first control signal S1 that varies with the change of the strength of the magnetic field coupled to the coil of the passive RFID tag, and inputs the first control signal S1 to the first signal processing circuit and the second signal processing circuit, wherein: when the voltage value of the first control signal S1 is too low to drive the inverting sub-module in the first signal processing circuit to be turned on, the logic signal S2 outputted by the first signal processing circuit is a high level "1"; when the voltage value of the first control signal S1 gradually increases to the turn-on voltage of the inverting sub-module, the logic signal S2 outputted by the first signal processing circuit is a low level "0"; the first signal processing circuit returns the logic signal S2 of the high level "1" or the low level "0" to the signal generating circuit; and when the voltage value of the first control signal S1 is lower than the sum of the threshold voltage of the unidirectional conduction threshold device and the turn-on voltage of the inverting sub-module in the second signal processing circuit, the logic signal S2' outputted by the second signal processing circuit is the high level "1"; when the voltage value of the first control signal S1 gradually increases to the sum of the threshold voltage of the threshold device and the turn-on voltage of the inverting sub-module in the second signal processing circuit, the logic signal S2' outputted by the second signal processing circuit is the low level "0"; and the second signal processing circuit inputs the above logic signal S2' of the high level "1" or the low level "0" to the second signal control circuit; and S3: when the inputted logic signal S2 is the high level "1", the first N-type MOS transistor in the signal generating circuit is turned on, and the second resistive device is short-circuited; because the resistance value of the first resistive device is far smaller than the resistance value of the second resistive device, the first control signal S1 is rapidly pulled down to a low level signal, such that the second N-type MOS transistor in the first discharge circuit is turned off, and the first discharge path maintains the turned-off state; when the inputted logic signal S2 is the low level "0", the first N-type MOS transistor is turned off, and the first control signal S1 maintains a high-level signal, such that the second N-type MOS transistor is turned on, the first discharge path is switched from the turned-off state to the turned-on state, and the charges at an antenna terminal are outputted to the ground; when the inputted logic signal S2' is the high level "1", the third N-type MOS transistor in the second signal control circuit is turned on, and the fourth resistive device is short-circuited; because the resistance value of the third resistive device is far smaller than the resistance value of the fourth resistive device, the second control signal S3 is rapidly pulled down to a low level signal, such that the fourth N-type MOS transistor in the second discharge circuit is turned off, and the second discharge path maintains the turned-off state; when the inputted logic signal S2' is the low level "0", the third N-type MOS transistor is turned off, and the third control signal S3 maintains a high-level signal, such that the fourth N-type MOS transistor is turned on, the second discharge path is switched from the turned-off state to the turned-on state, and the charges at the antenna terminal are outputted to the ground.

9. The positive feedback latch amplitude limiting control method according to claim 8, wherein when the field strength changes from weak to strong, the step S2 includes following states:

a: when 0<S1<the turn-on voltage of the first inverting sub-module and the second inverting sub-module, both the logic signal S2 and the logic signal S2' are the high level "1", and both the first discharge path and the second discharge path maintain the turned-off state;

b: when the turn-on voltage of the first inverting sub-module and the second inverting sub-module≤S1<the sum of the threshold voltage and the turn-on voltage of the third inverting sub-module and the fourth inverting sub-module, the logic signal S2 is the low level "0", the logic signal S2' is the high level "1", the first discharge path is in the turned-on state to maintain discharging, and the second discharge path maintains the turned-off state; and c: when the sum of the threshold voltage and the turn-on voltage of the third inverting sub-module and the fourth inverting sub-module≤S1, both the logic signal S2 and the logic signal S2' are the low level "0", and both the first discharge path and the second discharge path are in the turned-on state to maintain discharging; or when the field strength changes from strong to weak, the step S2 includes following states:

a': when the sum of the threshold voltage and the turn-on voltage of the third inverting sub-module and the fourth inverting sub-module≤S1, both the logic signal S2 and the logic signal S2' are the low level "0", and both the first discharge path and the second discharge path are in the turned-on state to maintain discharging;

b': when the turn-on voltage of the first inverting sub-module and the second inverting sub-module≤S1<the sum of the threshold voltage and the turn-on voltage of the third inverting sub-module and the fourth inverting sub-module, the logic signal S2 is the low level "0", the logic signal S2' is the high level "1", the first discharge path is in the turned-on state to maintain discharging, and the second discharge path maintains the turned-off state; and c': when 0<S1<the turn-on voltage of the first inverting sub-module and the second inverting sub-module, both the logic signal S2 and the logic signal S2' are the high level "1", and both the first discharge path and the second discharge path maintain the turned-off state.

\* \* \* \* \*